US008892894B2

(12) United States Patent
Torrubia et al.

(10) Patent No.: US 8,892,894 B2
(45) Date of Patent: *Nov. 18, 2014

(54) COMPUTER-IMPLEMENTED METHOD AND SYSTEM FOR EMBEDDING AND AUTHENTICATING ANCILLARY INFORMATION IN DIGITALLY SIGNED CONTENT

(71) Applicant: Rovi Technologies Corporation, Santa Clara, CA (US)

(72) Inventors: Andres M Torrubia, Alicante (ES); Jordi Salvat, Alicante (ES)

(73) Assignee: Rovi Solutions Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/912,866

(22) Filed: Jun. 7, 2013

(65) Prior Publication Data
US 2013/0275319 A1 Oct. 17, 2013

Related U.S. Application Data

(63) Continuation of application No. PCT/IB2007/003032, filed on Jul. 31, 2007, and a continuation of application
(Continued)

(51) Int. Cl.
H04L 9/32 (2006.01)
(Continued)

(52) U.S. Cl.
CPC ............ *G06Q 30/0185* (2013.01); *G06F 21/51* (2013.01); *G06F 21/10* (2013.01); *G06F 21/64* (2013.01); *G06F 2221/0737* (2013.01)
USPC ............................. 713/176; 713/156; 713/160

(58) Field of Classification Search
CPC . G06F 21/10; G06F 21/51; G06F 2221/0737; G06F 21/64; G06Q 30/0185
USPC .......................................... 713/176, 156, 160
See application file for complete search history.

(56) References Cited

U.S. PATENT DOCUMENTS 5,892,904 A * 4/1999 Atkinson et al. ................. 726/22
6,049,671 A * 4/2000 Slivka et al. .................... 717/173
(Continued)

FOREIGN PATENT DOCUMENTS

EP 1049014 * 11/2000 ............. G06F 11/00
EP 1049014 A2 11/2000
(Continued)

OTHER PUBLICATIONS

"U.S. Appl. No. 11/395,194 , Response filed Jun. 5, 2012 to Non Final Office Action mailed Jan. 5, 2012", 8 pgs.
(Continued)

*Primary Examiner* — Kambiz Zand
*Assistant Examiner* — Tongoc Tran
(74) *Attorney, Agent, or Firm* — Inventive Patent Law P.C.; Jim H. Salter

(57) ABSTRACT

A computer-implemented system and method for embedding and authenticating ancillary information in digitally signed content are disclosed. The method and system include: loading digital content containing a digitally signed portion into memory for processing; identifying an existing digital signature block and an existing digital signature size block in a digitally signed file header of the digitally signed portion; obtaining a digital signature size value from the digital signature size block, the digital signature size value corresponding to the size of the digital signature block plus the length of an ancillary data block plus a pre-determined pad; authenticating the integrity of the digitally signed portion using the digital signature while processing the digital content; unwrapping a purchase mechanism built into as wrapper associated with the digital content; and extracting from the ancillary data block data referenced by instructions of the purchase mechanism, the extracting being performed without invalidating the digital signature.

18 Claims, 9 Drawing Sheets

Related U.S. Application Data

No. 12/696,725, filed on Jan. 29, 2010, now Pat. No. 8,484,476, which is a continuation-in-part of application No. 11/395,194, filed on Mar. 31, 2006, now Pat. No. 8,397,072.

(60) Provisional application No. 60/683,190, filed on May 20, 2005.

(51) Int. Cl.
| | |
|---|---|
| G06F 21/51 | (2013.01) |
| G06Q 30/00 | (2012.01) |
| G06F 21/10 | (2013.01) |
| G06F 21/64 | (2013.01) |

(56) References Cited

U.S. PATENT DOCUMENTS

| | | | | |
|---|---|---|---|---|
| 6,367,012 | B1 * | 4/2002 | Atkinson et al. | 713/176 |
| 6,804,779 | B1 * | 10/2004 | Carroni et al. | 713/176 |
| 7,283,965 | B1 * | 10/2007 | Michener | 704/500 |
| 7,370,211 | B2 * | 5/2008 | Rindborg et al. | 713/191 |
| 7,383,965 | B2 * | 6/2008 | Matsumoto | 221/113 |
| 7,401,221 | B2 * | 7/2008 | Adent et al. | 713/167 |
| 7,451,467 | B2 * | 11/2008 | Carver et al. | 725/34 |
| 2002/0082997 | A1 * | 6/2002 | Kobata et al. | 705/51 |
| 2003/0088783 | A1 * | 5/2003 | DiPierro | 713/189 |
| 2003/0188160 | A1 | 10/2003 | Sunder et al. | |
| 2004/0054912 | A1 | 3/2004 | Adent et al. | |
| 2004/0107356 | A1 | 6/2004 | Shamoon et al. | |
| 2005/0071633 | A1 | 3/2005 | Rothstein | |
| 2005/0086501 | A1 | 4/2005 | Woo et al. | |
| 2005/0188203 | A1 | 8/2005 | Bhaskaran et al. | |
| 2005/0246732 | A1 | 11/2005 | Dudkiewicz et al. | |
| 2005/0262502 | A1 | 11/2005 | Lari et al. | |
| 2006/0031763 | A1 | 2/2006 | Yeung | |
| 2006/0041580 | A1 | 2/2006 | Ozdemir et al. | |
| 2006/0085824 | A1 | 4/2006 | Bruck et al. | |
| 2006/0184798 | A1 | 8/2006 | Yaldwyn et al. | |
| 2006/0265591 | A1 | 11/2006 | Torrubia et al. | |
| 2008/0089435 | A1 | 4/2008 | Torrubia et al. | |
| 2008/0133928 | A1 | 6/2008 | Torrubia et al. | |
| 2008/0159715 | A1 | 7/2008 | Fuasaro et al. | |

FOREIGN PATENT DOCUMENTS

| | | | | |
|---|---|---|---|---|
| EP | 1081912 | * | 3/2001 | H04L 29/08 |
| EP | 1081912 | A2 | 3/2001 | |
| EP | 1396978 | | 3/2004 | |
| EP | 1638031 | A1 | 3/2006 | |
| JP | 2001043192 | A | 2/2001 | |
| JP | 2002503365 | A | 1/2002 | |
| JP | 2003509913 | | 3/2003 | |
| JP | 2004056793 | A | 2/2004 | |
| JP | 2004265380 | A | 9/2004 | |
| JP | 2004328548 | A | 11/2004 | |
| JP | 2005514703 | A | 5/2005 | |
| JP | 2005148778 | | 6/2005 | |
| JP | 2007013360 | | 1/2007 | |
| JP | 2010535372 | A | 11/2010 | |
| JP | 4972208 | | 4/2012 | |
| KR | 101085365 | B1 | 11/2011 | |
| WO | WO-9845768 | A1 | 10/1998 | |
| WO | WO-03028283 | | 4/2003 | |
| WO | WO-03058485 | A1 | 7/2003 | |
| WO | WO-2007054137 | A1 | 5/2007 | |
| WO | WO-2009016426 | A1 | 2/2009 | |
| WO | WO-2009016427 | | 2/2009 | |
| WO | WO-2009016427 | A1 | 2/2009 | |

OTHER PUBLICATIONS

"U.S. Appl. No. 11/953,293, Final office Action mailed Apr. 13, 2012", 8 pgs.

"Australian Application Serial No. 2007357078, First Examiner Report Response filed Feb. 3, 2012", 2 pgs.

"Australian Application Serial No. 2007357078, Office Action mailed Feb. 29, 2012", 2 pgs.

"Australian Application Serial No. 2007357078, Office Action Response Filed Apr. 5, 2012", 15 Pgs.

"Australian Appliaction Serial No. 2007357078, Subsequent Examiners Report mailed May 3, 2012", 2 pgs.

"Canadian Application Serial No. 2,690,095, Office Action mailed Feb. 2, 2012", 3 pgs.

"Canadian Application Serial No. 2,690,095, Response filed Jul. 11, 2012 to Office Action mailed Feb. 2, 2012", 8 pgs.

"Canadian Application Serial No. 2701776, Office Action Mailed May 8, 2012", 3 Pgs.

"Japanese Application Serial No. 2010-518756, Office Action mailed Jan. 18, 2012", w/eng. translation, 11 pgs.

"Japanese Application Serial No. 2010-518756, Office Action mailed May 11, 2012", w/eng. translation, 14 pgs.

"Japanese Application Serial No. 2010-518756, Response filed Apr. 17, 2012 to Office Action mailed Jan. 18, 2012", 8 pgs.

"Japanese Application Serial No. 2012-087430, Voluntary Amendments filed May 2, 2012", 5 pgs.

"U.S. Appl. No. 11/395,194, Non Final Office Action mailed Jan. 5, 2012", 12 pgs.

"U.S. Appl. No. 11/953,293, Response filed Dec. 21, 2011 to Non Final Office Action mailed Jul. 21, 2011", 9 pgs.

"Australian Application Serial No. 2007357078, Office Action filed Nov. 15, 2011", 16 pgs.

"Australian Application Serial No. 2007357078, Sub Examiner Report mailed Dec. 12, 2011", 2 pgs.

"Japanese Application Serial No. 2010-518757, Response filed Dec. 16, 2011 to Office Action mailed Sep. 16, 2011", 5 pgs.

"U.S. Appl. No. 11/395,194 , Response filed Oct. 27, 2011 to Final Office Action mailed May 27, 2011", 10 pgs.

"U.S. Appl. No. 11/395,194 Non-Final Office Action mailed Sep. 30, 2010", 12 pgs.

"U.S. Appl. No. 11/395,194, Final Office Action mailed Jun. 16, 2011", 16 pgs.

"U.S. Appl. No. 11/395,194, Response filed Sep. 3, 2010 to Final Office Action mailed Mar. 3, 2010", 10 pgs.

"U.S. Appl. No. 11/395,194, Response filed Feb. 28, 2011 to Non-Final Office Action mailed Sep. 30, 2010", 10 pgs.

"U.S. Appl. No. 11/953,293, Non Final Office Action mailed Jul. 21, 2011", 9 pgs.

"U.S. Appl. No. 12/031,104, Non Final Office Action mailed Jan. 26, 2011", 10 pgs.

"Australian Application Serial No. 2007357078, Examiner Report mailed Nov. 15, 2010", 2 pgs.

"European Application Serial No. 06840908.5, Response filed Jul. 28, 2008 to Office Action mailed Apr. 10, 2008", 20 pgs.

"International Application Serial No. PCT/IB2007/003032, International Preliminary Report on Patentability mailed Feb. 11, 2010", 5 pgs.

"Internationai Appiication Serial No. PCT/IB2007/003041, International Preliminary Report on Patentability mailed Feb. 11, 2010", 8 pgs.

"Japanese Application Serial No. 2008-511613, Notice of Allowance mailed Feb. 22, 2011", 6 pgs.

"Japanese Application Serial No. 2008-511613, Office Action mailed Dec. 14, 2010", 6 pgs.

"Japanese Application Serial No. 2010-518757, Office Action mailed Sep. 30, 2011", 10 pgs.

"Korean Application Serial No. 10-2010-7004137, Office Action mailed Mar. 29, 2011", 4 pgs.

"U.S. Appl. No. 11/395,194, Final Office Action mailed Mar. 3, 2010", 10 pgs.

"U.S. Appl. No. 11/395,194, Non-Final Office Action mailed Jul. 22, 2009", 9 pgs.

"U.S. Appl. No. 11/395,194, Response filed Nov. 23, 2009 to Non Final Office Action mailed Jul. 22, 2009", 9 pgs.

"U.S. Appl. No. 11/953,293, Preliminary Amendment mailed Jan. 23, 2008", 3 pgs.

(56) References Cited

OTHER PUBLICATIONS

"European Application Serial No. 06840908.5, Office Action mailed Apr. 10, 2008", 5 pgs.

"How to get Information from Authenticode Signed Executables", *Microsoft*, [Online]. Retrieved from the Internet: <URL: http://supportmicrosoft.com/kb/323809/en-us>, (Sep. 27, 2004).

"International Application Serial No. PCT/EP2006/004628, International Preliminary Report on Patentability mailed Dec. 6, 2007", 10 pgs.

"International Application Serial No. PCT/EP2006/004628, International Search Report Dec. 4, 2006", 9 pgs.

"International Application Serial No. PCT/IB2007/003032, International Search Report mailed Apr. 4, 2008", 5 Pgs.

"International Application Serial No. PCT/IB2007/003032, Written Opinion mailed Apr. 4, 2008", 7 Pgs.

"International Application Serial No. PCT/IB2007/003041, International Search Report and Written Opinion mailed Sep. 1, 2008", 13 pgs.

* cited by examiner

Figure 8

Authenticating Ancillary Information in Digitally Signed Content Processing Logic
-800-

↓

Load a file or transmission containing a digitally signed executable into memory for execution, while checking for the integrity of the digital signature and the contents of the executable.
-802-

↓

Erase any non-authenticated regions of the file or transmission by zeroing out or value-filling the memory locations of the non-authenticated regions.
-804-

↓

Optionally, virtualize access to the contents of such executable file on disk and erase any non-authenticated regions of the virtualized file or transmission.
-806-

↓

End

COMPUTER-IMPLEMENTED METHOD AND SYSTEM FOR EMBEDDING AND AUTHENTICATING ANCILLARY INFORMATION IN DIGITALLY SIGNED CONTENT

CROSS-REFERENCE TO PRIORITY PATENT APPLICATIONS

The present application is a continuation under 35 U.S.C. 111(a) of PCT Application Serial No. PCT/IB2007/003032, filed on Jul. 31, 2007, which published as WO2009/016426 A1 on Feb. 5, 2009, which is hereby incorporated by reference in its entirety.

The present application is a continuation of U.S. patent application Ser. No. 12/696,725, filed on Jan. 29, 2010, now U.S. Pat. No. 8,484,476, which is a continuation-in-part of U.S. patent application Ser. No. 11/395,194, filed on Mar. 31, 2006, now U.S. Pat. No. 8,397,072, which claims the benefit of the filing date of U.S. Provisional Patent Application Ser. No. 60/683,190, filed on May 20, 2005, which applications are incorporated herein by reference in their entirety.

BACKGROUND

1. Technical Field

This disclosure relates to distribution of digital content. More particularly, the present disclosure relates to embedding and authenticating ancillary information in digitally signed content.

2. Related Art

The advent of digital distribution has created new business models for the delivery of software over the internet. In the "try and buy" a digital distribution model, consumers may sample "try and buy" versions of software before making a purchase decision. Such "try and buy" versions consist of locked down versions of software executables that get unlocked after purchase. In a common scenario, an end-user or potential customer may download a freely available, "try and buy" software application (the installer, henceforth) from the publisher website or general-purpose web portals (e.g. www.download.com, www.yahoo.com, etc., portals, henceforth). Typically, a percentage of the users that download and install the "try and buy" installers purchase the software (or services, or subscriptions associated with it) to obtain a full version of the software product. As such, software manufacturers have an incentive to make "try and buy" software available for download by end-users. Software manufacturers do so by placing such "try and buy" versions on their own websites for end users to download. In addition, software manufacturers may distribute these installers across portals, that are not necessarily controlled by software manufacturers. The motivation behind the "try and buy" business model for the software publishers lies in the fact that they get compensated when the consumer makes a purchase related to the "try and buy" software. In addition, portals arrange business deals with software manufacturers, publishers, or aggregators so that the portals are compensated when "try and buy" installers are downloaded from the portal sites and generate revenue. Typically, portals get a revenue share of the price paid by the consumer.

The "try and buy" installers contain means for end users to purchase the full version of the software application. As part of the purchase transaction, the end-users may be instructed to perform various steps in the online purchase transaction. Such instructions may include, for example, 1) textual descriptions to complete an economic transaction, e.g. send a check to P.O. Box xyz, and receive instructions to obtain the Intl version of the software application, 2) a URL that contains instructions or means for carrying out online e-commerce transactions (e.g. credit card payments), 3) a purchase mechanism built into the application itself, 4) a purchase mechanism built into a wrapper around the software application, or 5) any combination or these instructions. Because the same software product is normally distributed across multiple distribution networks (e.g. multiple portals), a way of tracking, which distribution network was responsible for a particular purchase is required. One way of determining which distribution network was responsible for a particular purchase is to create traceable versions of the software product. One way of creating traceable versions consists of creating different installers that contain information to identify the distribution network in the purchase instructions. For example, a software product may have a purchase URL embedded containing a value identifying a particular distribution network, for example:
http://my.trymedia.com/buy?sku=0123&affiliate=abc Such a URL can be used for software distribution across a distribution network identified by the parameter, "affiliate=abc". If the same software product is to be distributed across another distribution network (e.g. "affiliate=xyz"), then another version of the same software product must be created having a purchase URL embedded that identifies the other distribution network, for example:
http://my.trymedia.com/buy?sku=0123&affiliate=xyz Software publishers may create different, traceable versions of a software product by a variety of means that are known to those of ordinary skill in the art. For example, 1) recompiling the software executables containing different ancillary information to identify a distribution channel, 2) including such information in an auxiliary file, resource, or data referenced by the instructions of the purchasing process, or 3) any combination of the above. In most cases, it is advisable to create different traceable versions of the same software product without involving the software manufacturer, so the process can be scaled as efficiently as possible. One possible way to do so is to embed distribution related information in a predefined location in the installer or in a predefined location in the registry of a filesystem when an installer is first executed. One benefit of the embedding distribution related information in the installer is that this method does not require the software manufacturer to create a specific version of the software for each distribution network. Nevertheless, creating and managing different installers for each of a growing number of distribution networks has become a very difficult task, The introduction of digital signatures in executables provides security benefits for software manufacturers and end-users. For end users, digital signatures of executables provide a tool to ensure that the executable has not been modified in any way since it was signed, typically by the software manufacturer. For software manufacturers, the benefit translates in less chances of having their software modified or altered without permission (e.g. by a computer virus that infects the executable), resulting in less support calls and more user confidence in the software. In the Microsoft™ Windows operating system executables, digital signatures are implemented in the form of certificates. In the header of an executable, a certificate table is provided, which contains information to access various attributes of the digital certificate. Once the software manufacturer has signed an executable file, the contents of the executable cannot be easily changed without rendering the certificate invalid or causing the digital signature of the file to mismatch with the digital certificate of the file. In addition, the growing threats of viruses, spyware, and other malware is making operating systems and Internet browser vendors more likely to issue warnings when executable files are not digitally signed. This will surely result in thither adoption and widespread use of digital signatures with executables.

However, as described above, it is inefficient to create different versions of software products for different distribution networks. Further, it is very difficult to modify the contents of executables without destroying the integrity of the digital signature of the executable. As such, it is very difficult for someone other than a software manufacturer to create traceable copies of software products; because modifying the ancillary distribution-related information for a traceable copy would invalidate the digital signature.

Thus, a computer-implemented system and method for embedding and authenticating ancillary information in digitally signed content are needed.

BRIEF DESCRIPTION OF THE DRAWINGS

Embodiments illustrated by way of example and not limitation in the figures of the accompanying drawings, in which:

FIGS. 8 and 9 are flow diagrams illustrating the basic processing operations performed in an example embodiment.

DETAILED DESCRIPTION

A computer-implemented system and method for embedding and authenticating ancillary information in digitally signed content are disclosed. In the following description, numerous specific details are set forth. However, it is understood that embodiments may be practiced without these specific details. In other instances, well-known processes, structures and techniques have not been shown in detail in order not to obscure the clarity of this description.

Figure 1:
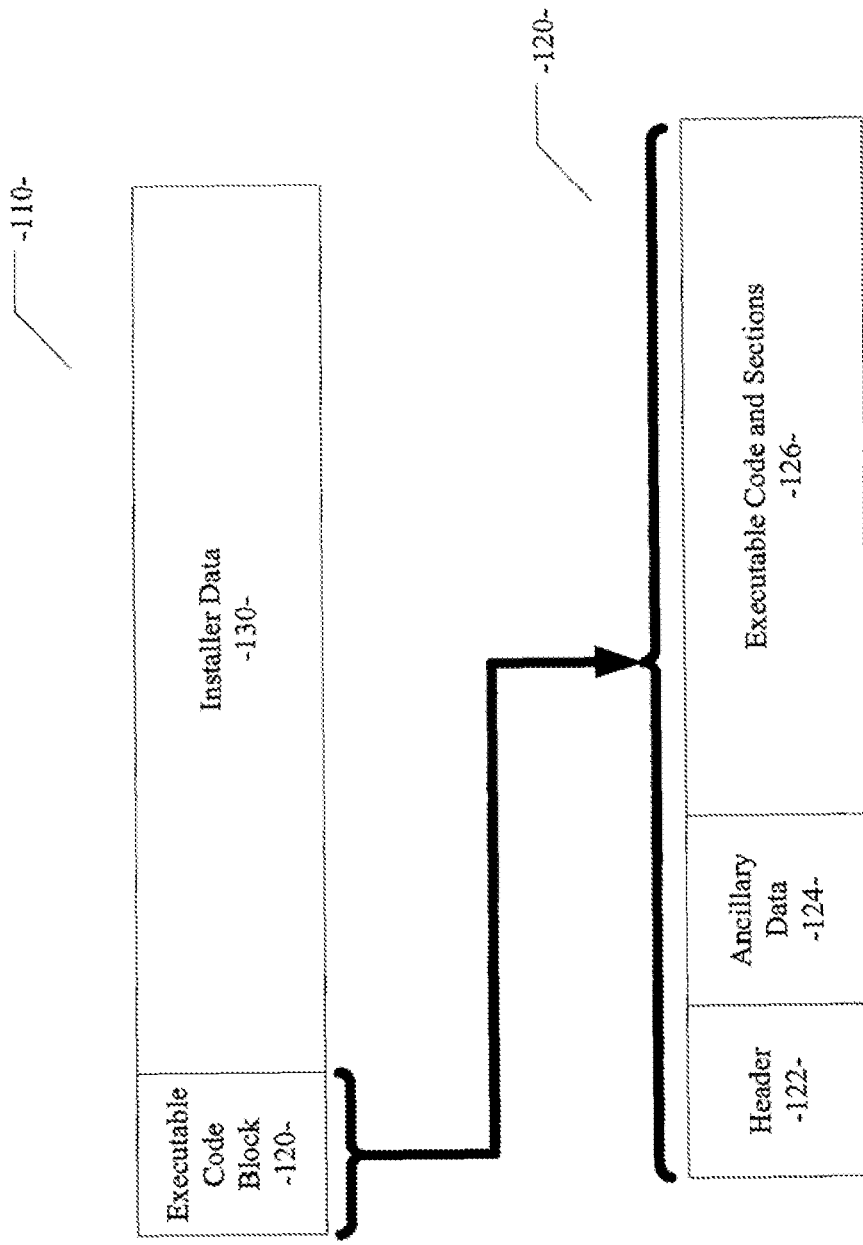
FIG. 1 illustrates an embodiment in which ancillary information is stored in the header portion of an executable file.
Figure 2:
FIG. 2 illustrates examples of three different installers with different ancillary data within their respective executable code blocks.

FIG. 1 illustrates an embodiment in which ancillary information (e.g. distribution information) is stored in the header portion of the executable part of an installer. As shown, an installer 110 includes an executable code block 120 and installer data 130. Executable code block 120 is comprised of a header portion 122, and ancillary data portion 124 that resides within the header portion, and an executable code section 126. Ancillary data 124, can include distribution related information, URLs, pricing information, timestamps, distribution channel information business rules, digital rights management (DRM) information, distributor branding information, pointers or links to other information, and any other information of use to a software manufacturer, distributor, wholesaler, retailer, or end user. It will be apparent to one of ordinary skill in the art that a variety of different types of information, including aggregations or combinations of different types of ancillary information may be included in ancillary data 124. Such ancillary information 124 can be created, stored, and transferred within an installer to which it relates. Given ancillary data block 124 within installer 110, a specific installer can be created for a particular software product. For example, the same software product can be distributed in multiple different methods using multiple different specific installers, each with specific ancillary data 124 that defines the distribution methodology for that particular distribution network. Referring to FIG. 2, examples of three such different installers with different ancillary data within their respective executable code blocks, 121, 122, and 123 are illustrated. Each of the three example installers illustrated in FIG. 2 can be used to distribute a software product in a particular distribution network; note that the installer data 131 is the same on the three different installers Only the executable code blocks, 121, 122, and 123 are different to reflect the different distribution networks for each installer.

Figure 3:
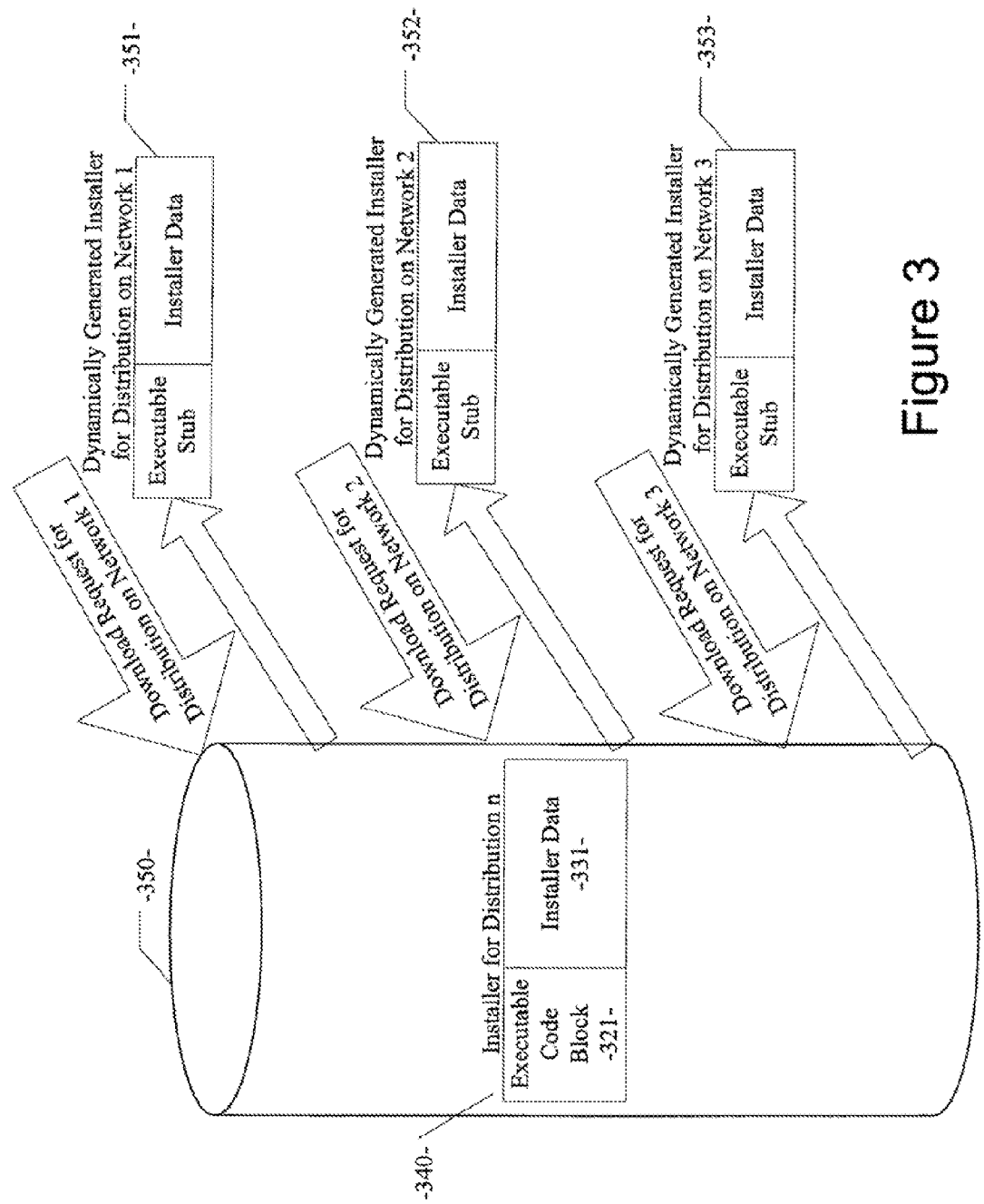
FIG. 3 illustrates an example of how distribution on a variety of distribution networks is accomplished in various embodiments.

Referring to FIG. 3, an example illustrates how distribution on a variety of distribution networks is accomplished in various embodiments. In the example of FIG. 3, a server 350 includes an installer template 340. The installer template 340 includes an executable code block 321 and installer data 331. Upon receiving a request for the download of a particular software product on a particular distribution network (e.g. network 1), server 350 generates distribution network-specific information (e.g. network 1) and stores the information in a copy of installer template 340. The distribution network-specific installer 351 can then be sent to the originator of the request for distribution of the software product on the specific distribution network. Similarly, other distribution network-specific installers, 352 and 353, can be generated from installer template 340 and sent to the originators of those particular download requests. In this manner, an efficient and scalable solution for the distribution of software products in a multiple of distribution networks is provided.

The use of digital signatures in downloaded executables is becoming increasingly more common. However, once the software manufacturer has signed an executable file, the contents of the executable cannot be easily changed without rendering the certificate invalid or causing the digital signature of the file to mismatch with the digital certificate of the file. As such, it has become difficult to insert ancillary information into the installer for a particular software product download. Nevertheless, various embodiments described herein solve this problem, as will be described in more detail below.

Figure 4:
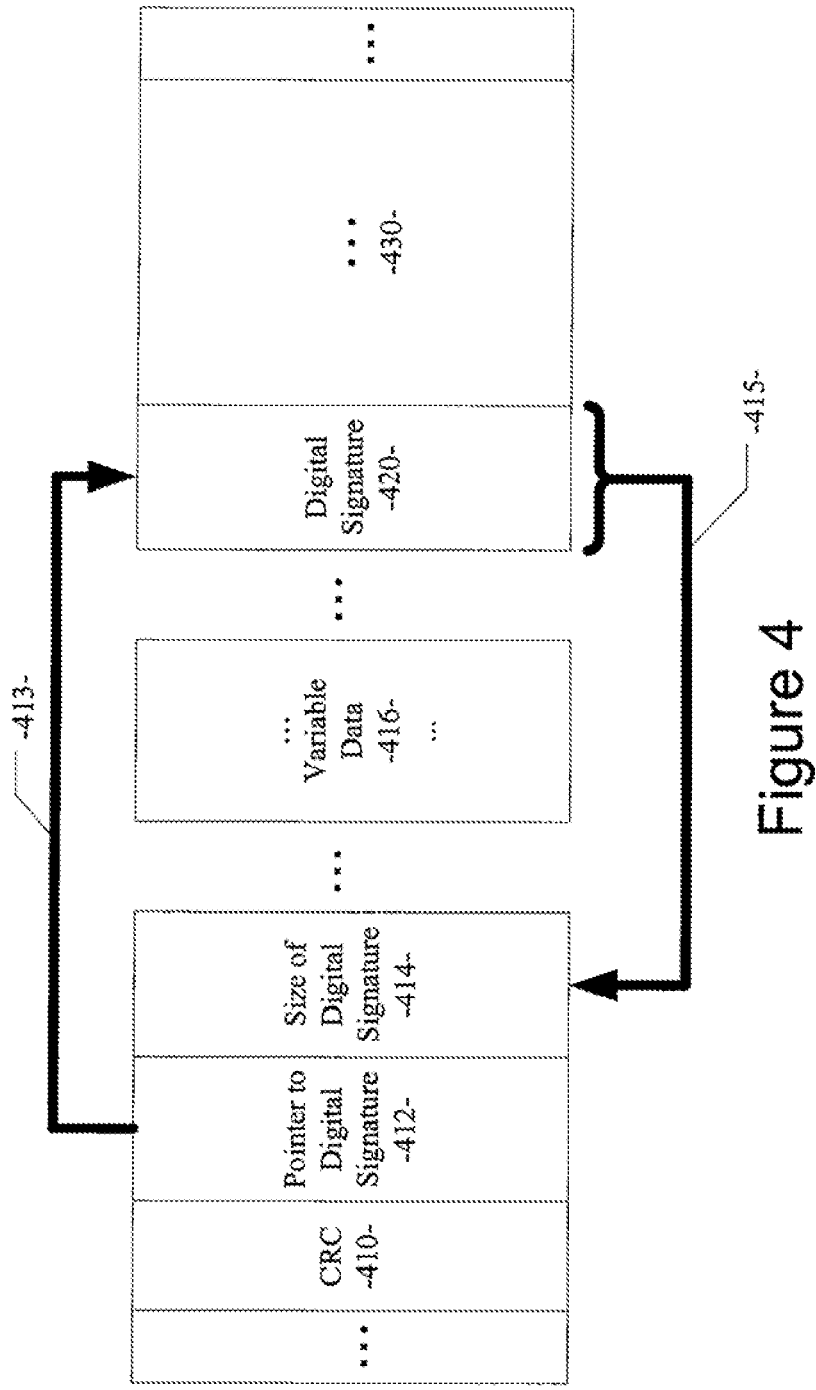
FIG. 4 illustrates a typical structure Ufa digitally signed executable file.

Referring to FIG. 4, a typical structure of a digitally signed executable file 401 is illustrated. File 401 typically includes a cyclic redundancy cheek (CRC) block 410, as digital signature pointer 412, a digital signature size 414, a variable data block 416, a digital signature block 420, and an unused portion 430. As well known to those of ordinary skill in the art, digital signature 420 is generated from a hash of the variable data 416 and executable headers in combination with the private key of the software developer and the private key of a trusted authority. Variable data 416 can be virtually any code or data payload within the file 401, including, executable headers. Typically, a downloadable software product and related data can be stored in variable data block 416. Once the software product is stored in variable data block of 416 and the digital signature 420 is generated from the content of variable data block 416, it becomes very difficult to modify any portion of variable data block 416 without invalidating digital signature 420. The size of the generated digital signature 420 is stored in digital signature size block of 414. Because variable data block 416 can be of variable size, a pointer 413 to digital signature 420 is stored in digital signature pointer block 412. In typical implementations of digitally signed executable file 401, CRC block 410, digital signature pointer 412, and digital signature size 414 are not included in the computation of digital signature 420. As such, these blocks of file 401 can be modified without invalidating digital signature 420.

Figure 5:
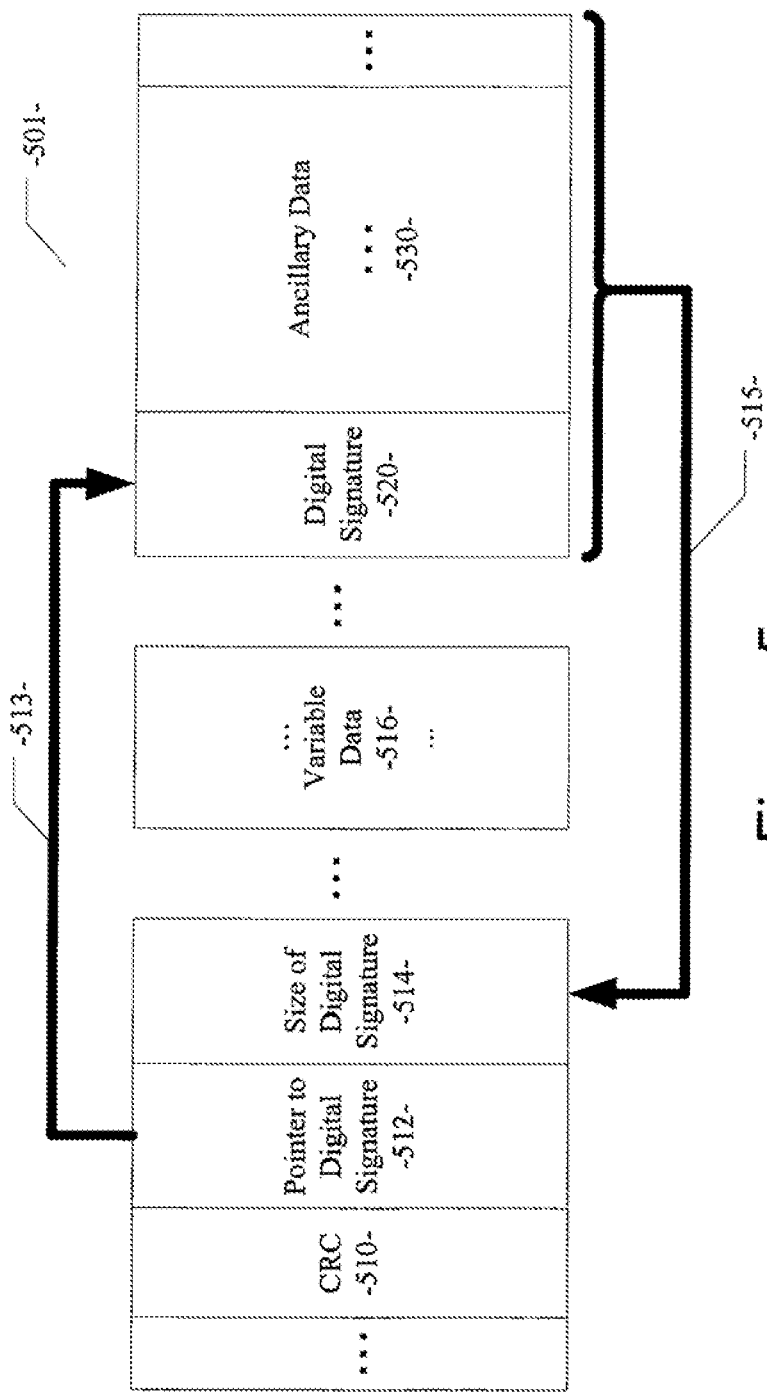
FIG. 5 illustrates a modified digitally signed executable file according to various embodiments.

Referring to FIG. 5, a modified digitally signed executable file 501 according to various embodiments is illustrated. File 501 has been modified by changing the value of the digital signature size residing in block 514. The value of the digital signature size has been modified by taking the size of the digital signature 520 and adding to it the size of unused block 530. In some cases, it may be necessary to increase (or decrease) the modified digital signature size value by a pre-determined pad value to terminate ancillary data block 530 on a byte, word, page, or other memory segment boundary. In other cases, it may be necessary to preliminarily zero out or store a default value in each memory location of ancillary data block 530. This new digital signature size value is stored in digital signature size block 514 as shown by arrow 515 in FIG. 5. Because the digital signature size value in block 514 is not included in the computation of digital signature 520, the modification of the digital signature size in block 514 does not invalidate digital signature 520. Additionally, because of the conventional construction of digital signature 530, appending additional memory space 530 at the end of digital signature 520 also does not invalidate digital signature 520. The addition of unused memory space 530 to file 501 enables a third party to store ancillary data in block 530. Ancillary data stored in block 530 can be used for a variety of purposes. For example, ancillary data stored in block 530 can include distribution related information, URLs, pricing information, timestamps, distribution channel information, business rules, digital rights management (DRM) information, distributor branding information, pointers or links to other information, and any other information of use to a software manufacturer, distributor, wholesaler, retailer, or end user. It will be apparent to one of ordinary skill in the art that a variety of different types of information, including aggregations or combinations of different types of ancillary information may be included in block 530. Such ancillary information can be created, stored, and transferred within block 530 of file 501 without invalidating digital signature 520.

In an alternative embodiment, the data in CRC block 510 can be overwritten with ancillary data. Because the CRC value in block 510 is not included in the computation of digital signature 520, the modification of the CRC data in block 510 does not invalidate digital signature 520. However, the size of CRC block 510 is very restrictive. In typical implementations of the structure of file 501, a very small amount of information can be stored in block 510. A pointer, link, or index to a larger block of ancillary data could be stored in block 510, such ancillary data being stored in a local or remote location (e.g. a server).

Figure 6:
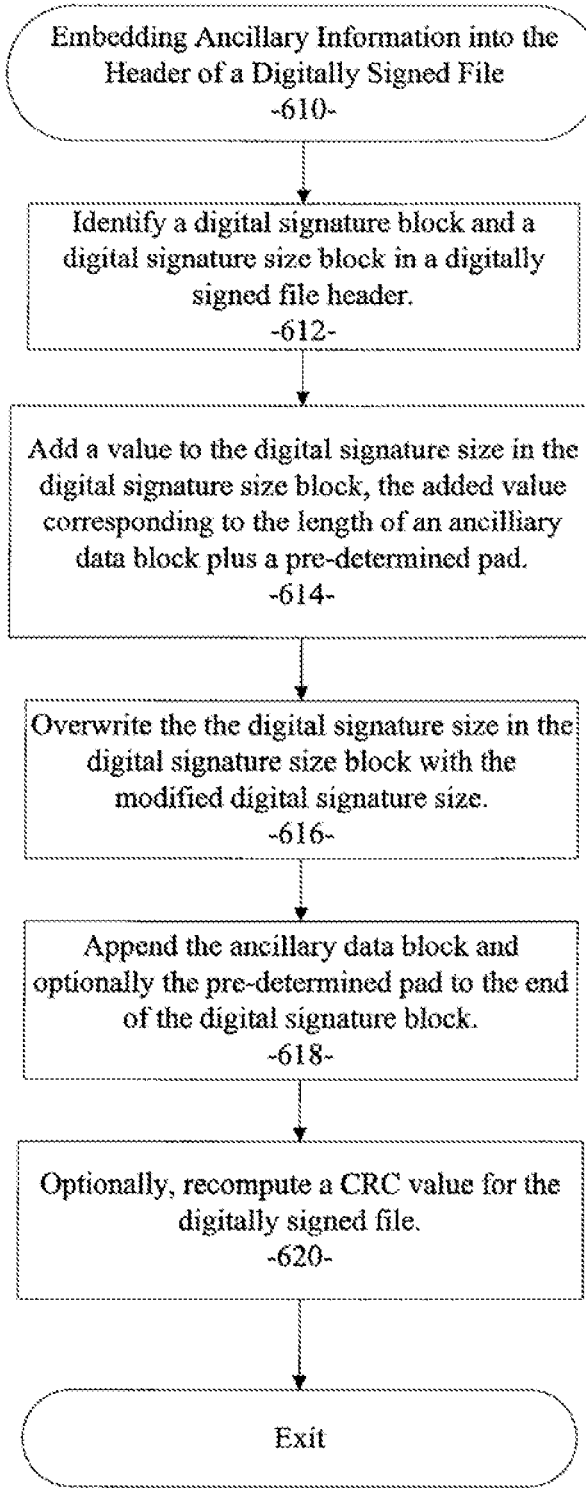
FIG. 6 illustrates a flow chart showing the basic processing operations performed in an embodiment.

Referring to FIG. 6, a flow chart illustrates the basic processing operations performed in an embodiment. At block of 612, a digitally signed file 501 is read and a digital signature block and a digital signature size block the end, the digitally signed file header is identified. In block 614, the digital signature size is retrieved from the digital signature size block and the digital signature size value is modified. The value of the digital signature size is modified by taking the size of the digital signature (i.e. the old value in the digital signature size block) and adding to it the size of an unused data block in which ancillary data can be stored. In some cases, it may be necessary to increase (or decrease) the modified digital signature size value by a pre-determined pad value to terminate the ancillary data block on a byte, word, page, or other memory segment boundary. In other cases, it may be necessary to preliminarily zero out or store a default value in each memory location of ancillary data block 530. This new digital signature size value is stored in the digital signature size block in processing block 616. The ancillary data corresponding to this digitally signed file 501 is generated in processing block 618 and stored in ancillary data block 530. In processing block 620, the CRC value for the modified file 501 can be recomputed and stored in CRC block 510. Given the ancillary data stored in block 530 within digitally signed file 510 according to various embodiments, a specific installer can be created for to particular software product by a third party. Further, digitally signed files can be modified to include digital rights management policies, access controls, purchasing procedures, or a variety of other content-specific, party-specific, or transaction-specific, information associated with a particular digitally signed file 501.

Figure 7A:
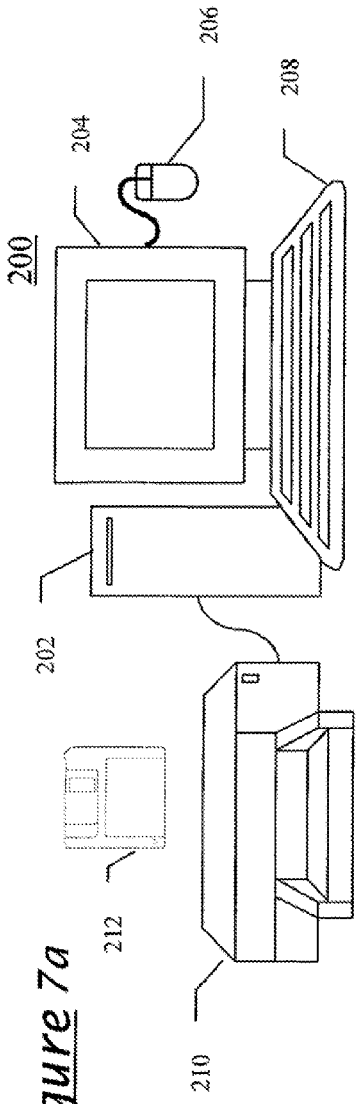
FIGS. 7a and 7b are block diagrams of a computing system on which an embodiment may operate and in which embodiments may reside.
Figure 7B:
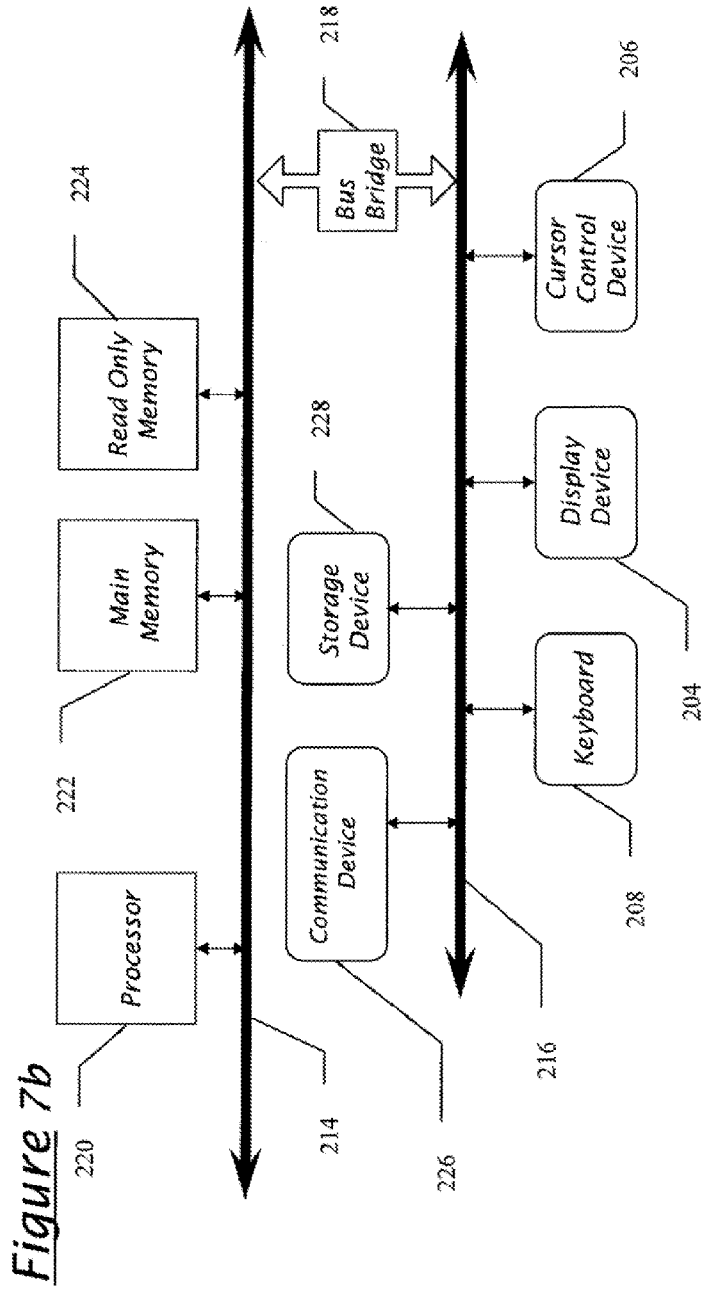

FIGS. 7*a* and 7*b* show an example of a computer system 200 illustrating an exemplary client or server computer system in which the features of an example embodiment may be implemented. Computer system 200 is comprised of a bus or other communications means 214 and 216 for communicating information, and a processing means such as processor 220 coupled with bus 214 for processing information. Computer system 200 further comprises a random access memory (RAM) or other dynamic storage device 222 (commonly referred to as main memory), coupled to bus 214 for storing information and instructions to be executed by processor 220. Main memory 222 also may be used for storing temporary variables or other intermediate information during execution of instructions by processor 220. Computer system 200 also comprises a read only memory (ROM) and/or other static storage device 224 coupled to bus 214 for storing static information and instructions for processor 220.

An optional data storage device 228 such as a magnetic disk or optical disk and its corresponding drive may also be coupled to computer system 200 for storing information and instructions. Computer system 200 can also be coupled via bus 216 to a display device 204, such as a cathode ray tube (CRT) or a liquid crystal display (LCD), for displaying information to a computer user. For example, image, textual, video, or graphical depictions of information may be presented to the user on display device 204. Typically, an alphanumeric input device 208, including alphanumeric and other keys is coupled to bus 216 for communicating information and/or command selections to processor 220. Another type of user input device is cursor control device 206, such as a conventional mouse, trackball, or other type of cursor direction keys for communicating direction information and command selection to processor 220 and for controlling cursor movement on display 204.

A communication device 226 may also be coupled to bus 216 for accessing remote computers or servers, such as a web server, or other servers via the Internet, for example. The communication device 226 may include a modem, a network interface card, or other well-known interface devices, such as those used for interfacing with Ethernet, Token-ring, wireless, or other types of networks. In any event, in this manner, the computer system 200 may be coupled to a number of servers via a conventional network infrastructure.

The system of an example embodiment includes software, information processing hardware, and various processing steps, as described above. The features and process steps of example embodiments may be embodied in machine or computer executable instructions. The instructions can be used to cause a general purpose or special purpose processor, which is programmed with the instructions to perform the steps of an example embodiment. Alternatively, the features or steps may be performed by specific hardware components that contain hard-wired logic for performing the steps, or by any combination of programmed computer components and custom hardware components. While embodiments are described with reference to the Internet, the method and apparatus described herein is equally applicable to other network infrastructures or other data communications systems.

It should be noted that the methods described herein do not have to be executed in the order described, or in any particular order. Moreover, various activities described with respect to the methods identified herein can be executed in repetitive, simultaneous, recursive, serial, or parallel fashion. Information, including parameters, commands, operands, and other data, can be sent and received in the form of one or more carrier waves through communication device 276.

Upon reading and comprehending the content of this disclosure, one of ordinary skill in the art will understand the manner in which a software program can be launched from a computer-readable medium in a computer-based system to execute the functions defined in the software program described above. One of ordinary skill in the art will further understand the various programming languages that may be employed to create one or more software programs designed to implement and perform the methods disclosed herein. The programs may be structured in an object-orientated format using an object-oriented language such as Java, Smalltalk, or C++. Alternatively, the programs can be structured in a procedure-orientated format using a procedural language, such as assembly or C. The software components may communicate using any of a number of mechanisms well known to those of ordinary skill in the art, such as application program interfaces or inter-process communication techniques, including remote procedure calls. The teachings of various embodiments are not limited to any particular programming language or environment, including HTML and XML.

Thus, other embodiments may be realized. For example, FIGS. 7a and 7b illustrate block diagrams of an article of manufacture according to various embodiments, such as a computer 200, as memory system 222, 224, and 228, a magnetic or optical disk 212, some other storage device 228, and/or any type of electronic device or system. The article 200 may include a computer 202 (having one or more processors) coupled to a computer-readable medium 212, and/or a storage device 228 (e.g., fixed and/or removable storage media, including tangible memory having electrical, optical, or electromagnetic conductors) or a carrier wave through communication device 226, having associated information (e.g., computer program instructions and/or data), which when executed by the computer 202, causes the computer 202 to perform the methods described herein.

Various embodiments are described. In particular, the use of embodiments with various types and formats of user interface presentations may be described. It will be apparent to those of ordinary skill in the art that alternative embodiments of the implementations described herein can be employed and still fall within the scope of the claims set forth below. In the detail herein, various embodiments are described as implemented in computer-implemented processing logic denoted sometimes herein as the "Software". As described above, however, the claimed invention is not limited to a purely software implementation.

As described above, ancillary data can be embedded within a signed executable file, the ancillary data being modifiable without breaking the already existing digital signature. The technique described above involved embedding such ancillary data into the digital signature directory, which is not computed as a part of the verified message. As a result, the described technique provides an effective way of individualizing installers for digital distribution at the time of download (or manufacture) with ancillary information (e.g. the source of distribution, etc.). One benefit of the described technique is that ancillary information can be dynamically injected into the executable at download time. This allows tracking of the distribution channels in a digital distribution business model consisting of multiple distributors. In such a business model, it is very desirable to be able to identify the source of a particular file to be able to compensate such source in the event of monetary or advertisement transactions or events related to a particular file. It is also very desirable for as digital distribution provider to store just one version of the downloadable assets and to create a tagged copy of such assets in an efficient manner. Dynamic (affiliate) tracking allows one to efficiently create a distribution network in which a single copy of a digital asset can be dynamically personalized at download or Fulfillment time to identify the source distribution for crediting, reporting or tracking purposes.

U.S. Pat. Nos. 5,892,904 and 6,367,012 describe a method to ensure the authenticity and integrity of a computer program or code received over a computer network. However, the methods described in the referenced patents do not ensure the authenticity and integrity of the transmitted executable file, which contains the signed program or code, the digital signature, and possibly some other data and padding.

For example, the Microsoft Windows operating system implements signed executables by adding an, "Attribute Certificate Table" and a, "Certificate Data" section containing the Authenticode signature. The image hash used to generate the Authenticode signature is generated from all sections in the file, except (according to Microsoft documentation) the following sections:
  i. The file checksum field of the Windows-specific fields of the optional header;
  ii. Information related to attribute certificates; and
  iii. Information located in a section past the end of the last section.

Because the image hash used to generate the Authenticode signature is not generated from the sections in the file referenced above (denoted herein as non-authenticated sections), modifications to these non-authenticated sections will not change or affect the hash and this will not affect the Authenticode signature. Thus, the authenticity and integrity of the transmitted executable file can be affected in the non-authenticated sections if the file or transmission without affecting the Authenticode signature of the file. In fact, the invention disclosed in published U.S. Patent Application No. 20060265591 exploits this fact to effectively change the executable file or transmission in useful ways without breaking the signature.

In various embodiments described in detail below, the authenticity and integrity of a file or transmission containing a digitally signed executable is verified by checking the regions of the file or transmission that are not included in the generation of the file or transmission's digital signature the non-authenticated regions). A process described below is used to verify that the non-authenticated regions do not contain non-required data and that required data in the non-authenticated regions has unequivocally specified values.

This verification of the content of the non-authenticated regions can be performed by the operating system resident in the machine receiving the transmission or manipulating the file, 1) when the file or transmission's digital signature is verified, 2) when the file or transmission is downloaded, or 3) at execution time by the executable file itself. If the verification process is performed at execution time by the executable file itself, the execution of the executable file is terminated if the verification should fail. Although performing the verification process at execution time by the executable file itself may not be an ideal solution in all circumstances, the process may be safe enough for many applications; because, the executable code is properly protected by the existing digital signature.

In a particular embodiment described in detail below, the authenticity and integrity of a file or transmission containing a digitally signed executable is verified using an implementation for Microsoft Windows PE (Portable Executable) files. In this particular embodiment, the verification process may include the following operations:

i. Check and verify that the checksum field in the Windows-specific fields of the optional header matches the image file checksum;
 ii. Check and verify to make sure there is no information past the end of the last section of the file or transmission;
 iii. Check and verify to make sure the attribute certificate table contains one single entry and does not contain padding or padding with fixed data; and
 iv. Check and verify to make sure the certificate actually fills the whole space allocated to it in the attribute certificate table, except for possible fixed-data padding to the next octaword boundary.

The verification process described above may require changes to the Portable Executable standard already deployed in millions of executables for consumption and binary creation or modification tools (e.g. forensic tools, linkers, compilers, etc.). As a result of such potentially needed changes to the Portable Executable standard, the verification process described above may not be optimal for some applications.

In another particular embodiment described in detail below, the authenticity and integrity of a file or transmission containing a digitally signed executable is verified using an implementation for Microsoft Windows PE (Portable Executable) files. In this particular embodiment, an operating system (OS) vendor or provider (e.g. Microsoft) can implement a verification process to mitigate or eliminate the security risk of executing a digitally signed file or transmission that contains non-authenticated regions. In this embodiment, the verification process prevents or monitors access to the non-authenticated regions when the executable is loaded into memory. The verification process of a particular embodiment may include the following operations:

i. Load a file or transmission containing a digitally signed executable into memory for execution, while checking for the integrity of the digital signature and the contents of the executable;
 ii. Erase any non-authenticated regions of the file or transmission by zeroing out or value-tilling the memory locations of the non-authenticated regions; and
 iii. Optionally, virtualize access to the contents of such executable file on disk and erase any non-authenticated regions of the virtualized file or transmission as described above. The virtualizing of the access to the contents of such executable file can be performed if the executable attempts to load itself (e.g. from another executable module related to it such as a DLL or COM object) using file input/output calls such as Win32 CreateFile.

In another particular embodiment described in detail below, the authenticity and integrity of a file or transmission containing a digitally signed executable is verified using an implementation for Microsoft Windows PE: (Portable Executable) files. In this particular embodiment, an operating system (OS) vendor or provider (e.g. Microsoft) can implement a verification process to mitigate or eliminate the security risk of executing a digitally signed file or transmission that contains non-authenticated regions. In this embodiment, the verification process prevents or monitors access to the non-authenticated regions when the executable is loaded into memory. The verification process of a particular embodiment may include the following operations:

i. Virtualize access to the contents of a digitally signed executable file on disk; and
 ii. Erase, for the virtualized files in memory, any non-authenticated regions of the file or transmission by zeroing out or value-tilling the locations of the virtualized files corresponding to the contents of the non-authenticated regions, including:
  1. The checksum field of the Windows-specific fields of the optional header;
  2. Information past the end of the last section of the file or transmission;
  3. Information related to attribute certificates; and
  4. Locations where the certificate does not fill the whole space allocated to it in the attribute certificate table.

Figure 9:
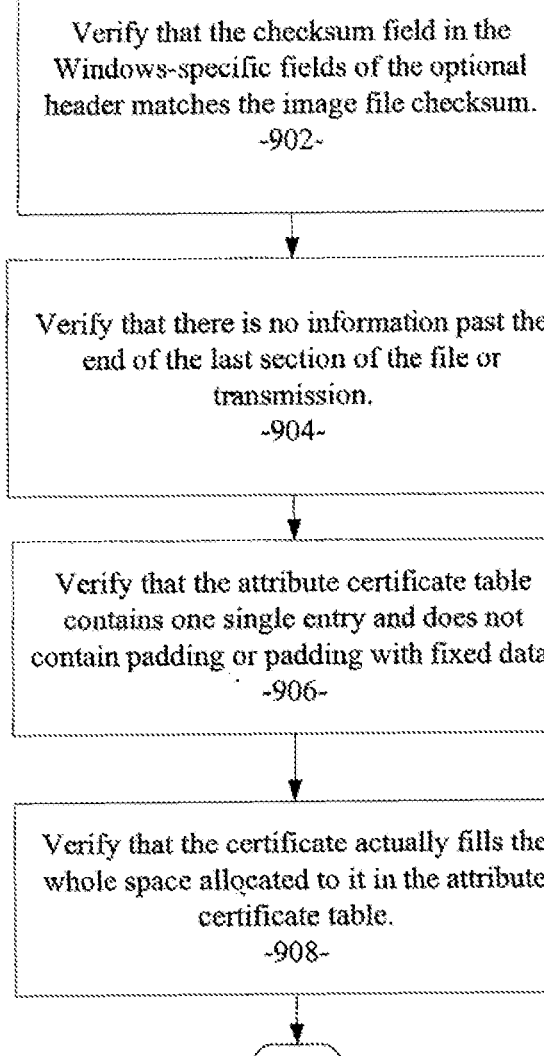

Referring to FIGS. 8 and 9, flow diagrams illustrate the basic processing operations performed in example embodiments.

Thus, a computer-implemented system and method for embedding and authenticating ancillary information in digitally signed content are disclosed. While the present invention has been described in terms of several example embodiments, those of ordinary skill in the art will recognize that the present invention is not limited to the embodiments described, but can be practiced with modification and alteration within the spirit and scope of the appended claims. The description herein is thus to be regarded as illustrative instead of limiting.

We claim:

1. A method comprising:
loading digital content containing a digitally signed portion into memory for processing, while checking for the integrity of a digital signature and the contents of the digitally signed portion;
identifying, by use of a processor, an existing digital signature block and an existing digital signature size block in a digitally signed file header of the digitally signed portion;
obtaining a digital signature size value from the digital signature size block, the digital signature size value corresponding to the size of the digital signature block plus the length of an ancillary data block plus a pre-determined pad;
authenticating the integrity of the digitally signed portion using the digital signature while processing the digital content;
unwrapping a purchase mechanism built into a wrapper associated with the digital content; and
extracting from the ancillary data block, by use of the processor, data referenced by instructions of the purchase mechanism, the extracting being performed without invalidating the digital signature.

2. The method as claimed in claim 1 wherein the ancillary data block and the pre-determined pad regions of the digital content include regions past the end of the last section of the digital content.

3. The method as claimed in claim 1 including verifying that a checksum field in a header of the digital content matches an image file checksum.

4. The method as claimed in claim 1 including verifying that the digital signature actually fills the whole space allocated to the digital signature in an attribute certificate table.

5. The method as claimed in claim 1 wherein the digital content is a file.

6. The method as claimed in claim 1 wherein the digital content is a digital transmission.

7. An article of manufacture embodied in a non-transitory machine storage medium including data that, when accessed by a machine, causes the machine to:
- load digital content containing a digitally signed portion into memory for processing, while checking for the integrity of a digital signature and the contents of the digitally signed portion;
- identify an existing digital signature block and an existing digital signature size block in a digitally signed file header of the digitally signed portion;
- obtain a digital signature size value from the digital signature size block, the digital signature size value corresponding to the size of the digital signature block plus the length of an ancillary data block plus a pre-determined pad;
- authenticate the integrity of the digitally signed portion using the digital signature while processing the digital content;
- unwrap a purchase mechanism built into a wrapper associated with the digital content; and
- extract from the ancillary data block data referenced by instructions of the purchase mechanism, the article of manufacture being configured to extract the data without invalidating the digital signature.

8. The article of manufacture as claimed in claim 7 wherein the ancillary data block and the pre-determined pad regions of the digital content include regions past the end of the last section of the digital content.

9. The article of manufacture as claimed in claim 7 being further configured to verify that a checksum field in a header of the digital content matches an image file checksum.

10. The article of manufacture as claimed in claim 7 being further configured to verify that the digital signature actually fills the whole space allocated to the digital signature in an attribute certificate table.

11. The article of manufacture as claimed in claim 7 wherein the digital content is a file.

12. The article of manufacture as claimed in claim 7 wherein the digital content is a digital transmission.

13. A system comprising:
- a processor;
- a memory in data communication with the processor; and
- a content distribution system, executable by the processor, configured to:
  - load digital content containing a digitally signed portion into the memory for processing, while checking for the integrity of a digital signature and the contents of the digitally signed portion;
  - identify an existing digital signature block and an existing digital signature size block in a digitally signed file header of the digitally signed portion;
  - obtain a digital signature size value from the digital signature size block, the digital signature size value corresponding to the size of the digital signature block plus the length of an ancillary data block plus a pre-determined pad;
  - authenticate the integrity of the digitally signed portion using the digital signature while processing the digital content;
  - unwrap a purchase mechanism built into a wrapper associated with the digital content; and
  - extract from the ancillary data block data referenced by instructions of the purchase mechanism, the article of manufacture being configured to extract the data without invalidating the digital signature.

14. The system as claimed in claim 13 wherein the ancillary data block and the pre-determined pad regions of the digital content include regions past the end of the last section of the digital content.

15. The system as claimed in claim 13 being further configured to verify that a checksum field in a header of the digital content matches an image file checksum.

16. The system as claimed in claim 13 being further configured to verify that the digital signature actually fills the whole space allocated to the digital signature in an attribute certificate table.

17. The system as claimed in claim 13 wherein the digital content is a file.

18. The system as claimed in claim 13 wherein the digital content is a digital transmission.

* * * * *